United States Patent
Pappas et al.

[11] Patent Number: 5,225,083
[45] Date of Patent: Jul. 6, 1993

[54] METHOD FOR BIOREMEDIATION OF GREASE TRAPS

[76] Inventors: Thomas C. Pappas; Jeri S. Pappas, both of 1034 Boulevard St., Shreveport, La. 71104

[21] Appl. No.: 743,796

[22] Filed: Aug. 12, 1991

[51] Int. Cl.[5] ............................................. C02F 3/00
[52] U.S. Cl. .................................... 210/606; 210/610
[58] Field of Search ................. 210/610, 611, 631, 606

[56] References Cited

U.S. PATENT DOCUMENTS

| | | | |
|---|---|---|---|
| 3,152,983 | 10/1964 | Davis et al. | 210/611 |
| 3,617,538 | 11/1971 | Bogert | 210/606 |
| 4,925,564 | 5/1990 | Francis | 210/610 |

*Primary Examiner*—Bernard Nozick
*Attorney, Agent, or Firm*—John M. Harrison

[57] ABSTRACT

A method for bioremediation of grease traps, which includes the steps of mechanically removing solid materials such as plastic items, food particles and the like from entrances to all drain lines and the drain lines themselves terminating in the grease traps; securing loose drain line covers and replacing broken covers; preventing the flow of all chemicals which are detrimental to the growth of endemic bacterial microorganisms into the drain lines and grease traps; adjusting the pH of the water effluent in the grease traps by introducing a basic material such as baking soda into the grease traps and mixing or stirring the water, which stimulates the endemic native bacteria resident in the grease trap; and adding endemic bacterial microorganisms to one or more of the drain lines for ultimate introduction into the grease traps and biodigesting grease in the drain lines and grease traps.

4 Claims, 1 Drawing Sheet

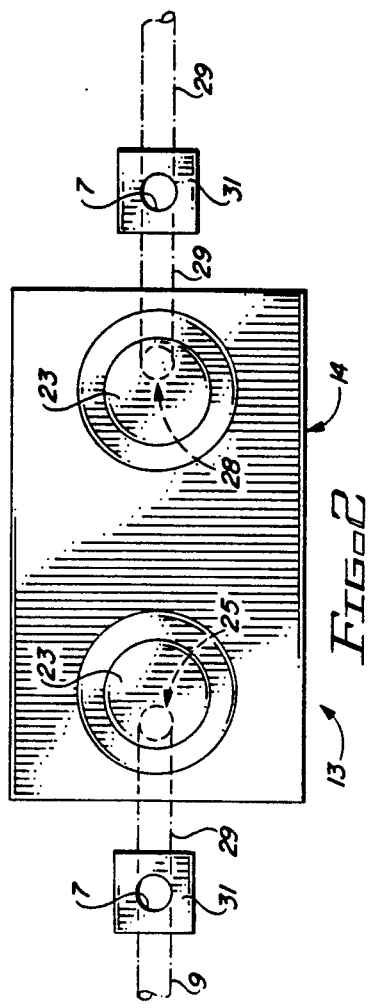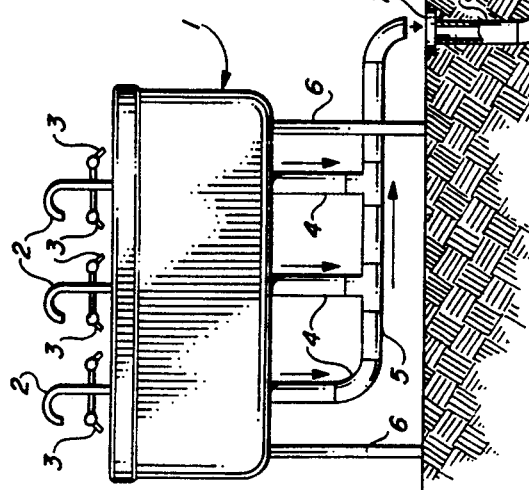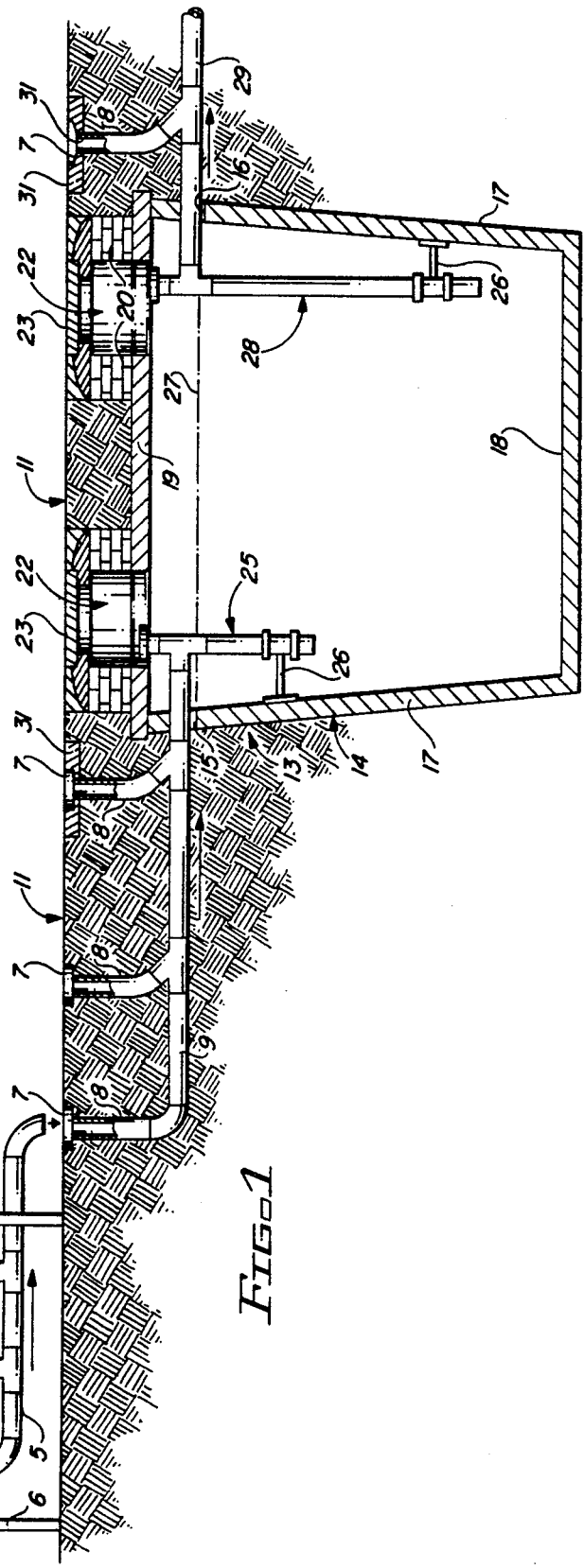

METHOD FOR BIOREMEDIATION OF GREASE TRAPS

BACKGROUND OF THE INVENTION

1. Field of the Invention

This invention relates to the clearing of domestic, commercial and industrial grease traps of grease consisting of animal fat (primarily triglycerides with some protein) and vegetable oil and more particularly, to a method for bioremediation of grease trap drain lines and grease traps using biotechnology, which method includes the steps of mechanically removing solid materials such as plastic items, food particles and the like from drain lines connecting the grease traps, securing drain line covers which are loose and replacing those covers which are broken, preventing the flow of all chemicals detrimental to endemic bacterial microorganism biodigestion into the drain lines and grease traps; adjusting the pH of the liquid in the grease traps by introducing a basic material such as baking soda or bicarbonate of soda into the drain lines and grease traps and mixing or stirring the effluent in the grease traps, which stimulates the endemic native bacteria resident in the grease trap; and adding endemic bacterial microorganisms to one or more of the drain lines for ultimate introduction into the grease traps and digesting grease in the grease traps.

An essential feature of this invention is the creation of an environment and ecosystem in grease traps which is conducive to biodigestion of grease by endemic bacterial microorganisms having a biodigestive affinity for the grease in the grease traps. The creation of this ideal environment for bacterial microorganism activity is achieved by initially clearing the drain lines and connecting grease traps of extraneous solid material such as plastic cups, straws, bits of paper, food particles, impacted grease and the like; preventing introduction of chemicals which might stop or inhibit the growth of the bacterial microorganisms and biodigestion of the grease into the grease traps; adjusting the pH of the effluent in the grease traps to facilitate a neutral environment for biodigestion by the bacterial microorganisms, which stimulates the endemic native bacteria resident in the grease trap; and introducing a suitable bacterial strain of microorganisms for effecting the desired biodigestion of the triglyceride hydrocarbons and proteins which compose the grease.

2. Description of the Prior Art

Commercial and industrial grease traps are typically cleaned by removing the contents using a vacuum truck or by other mechanical means for deposit elsewhere, an effort which fails to solve the disposal problem of grease trap waste. Grease which has impacted in drain lines and in the connecting grease trap is largely unaffected by the pumping operation, since the drain line and grease trap environment is not conducive to effective operation. For example, the accumulation of solid material, including bits of plastic, particles of "Styrofoam" containers, bottle caps, straws and the like, as well as particles of food, frequently totally or partially block the flow of effluent through the grease trap. The ideal solution to the problem of accumulated grease in grease traps is the creation of a proper environment and ecosystem within the grease traps and connecting drain system which is conducive to the introduction and growth of bacterial microorganisms that are designed to biodigest the grease, thereby eliminating the problem, not only in the grease traps but also in the drain lines to which the grease traps are connected. Proper growth and biodigestion of the grease by these microorganisms depends totally on the creation of a chemically neutral, natural bacteria-stimulated, non-toxic environment in the grease traps, and thus necessitates operational changes in the way the grease traps are used, to eliminate grease from the trap system in the commercial or industrial establishment in question.

It is an object of this invention to provide a method for removing grease from grease traps, which method includes adjusting the eco environment in the grease traps to conditions that are conducive to biodigestion of the grease by bacterial microorganisms designed for the purpose.

Another object of this invention is to provide a method for bioremediation of grease traps, which includes the steps of removing undesirable solid materials from the drain lines and grease traps, preventing the use of undesirable chemicals which would inhibit the growth and biodigestion of grease by microorganisms in the grease traps and connecting drain lines, adjusting the pH of the fluid in the grease traps to a neutral condition, to stimulate the endemic native bacteria resident in the grease trap; introducing a proper strain of bacterial microorganisms into the drain lines and grease traps for biodigestion of the grease in the grease traps and facilitating the natural flushing of acceptable effluent from the grease traps and connecting drain lines on a continuing basis to the connecting sewer lines.

Yet another object of this invention is to provide a new and improved method for effecting the biodigestion of grease and elimination of odor in grease traps and connecting drain lines, which method includes the introduction of biodigesting bacterial microorganisms into the grease traps under proper conditions of pH, chemical decontamination and absence of solid waste, to facilitate growth and operation of the microorganisms, biodigestion of the grease and prevent grease from flowing with the effluent from the grease traps into the connecting sewer system.

SUMMARY OF THE INVENTION

These and other objects of the invention are provided in a method for bioremediation of, and odor control in, grease traps and connecting drain lines using biotechnology to create a proper environment and ecosystem in the grease traps and drain lines through biodigestion of grease by suitable strains of bacterial microorganisms introduced into the grease traps through the drain lines. This bacterially favorable ecosystem and environment is created by the steps of removing undesirable solid material such as impacted grease, where possible, and plastic items, food particles and the like, from all drain lines connecting to the grease traps; securing drain line covers which are loose and replacing those covers which are broken; preventing the flow of all chemicals which are detrimental to bacterial microorganism growth and biodigestion into the drain lines and grease traps; adjusting the pH of the effluent in the grease traps by introducing baking soda, bicarbonated soda, or like chemically basic materials into the grease trap and mixing or stirring the effluent in the grease traps to adjust the pH to about 7, which stimulates the endemic native bacteria resident in the grease trap; and adding a proper strain of bacterial microorganism to the drain lines for ultimate introduction into the grease traps and biodigesting grease in the grease traps.

BRIEF DESCRIPTION OF THE DRAWING

The invention will be better understood by reference to the accompanying drawing, wherein:

FIG. 1 is a side sectional view of a typical sink, drain and grease trap system in a commercial or industrial establishment; and FIG. 2 is a top view of the drain and grease trap elements of the grease trap system illustrated in FIG. 1.

DESCRIPTION OF THE PREFERRED EMBODIMENTS

Referring to FIGS. 1 and 2 of the drawings, basic components in a commercial or industrial establishment for processing food items and disposing of vegetable oil and animal fat which combine to form grease, is a sink 1, having conventional faucets 2, faucet valves 3 and one or more sink drain lines 4, which connect to a common sink collection drain line 5. The sink 1 is typically supported by four sink supports 6 and floor drains 7 are typically provided in the floor 11, with underlying connecting floor drain lines 8 that serve a common floor collection drain line 9. The floor connection drain line 9 enters the trap container 14 of a grease trap 13 at the inlet line opening 15 in a trap side 17 of the trap container 14. A vertically-oriented trap inlet pipe 25 terminates the floor collection drain line 9 and extends downwardly toward the trap bottom 18 of the trap container 14, where it is braced against the trap side 17 by a pipe brace 26, as illustrated in FIG. 1. The top end of the trap inlet pipe 25 is open and communicates with an access opening 22, covered by an access opening cover 23, which is coplanar with the floor 11. Brick masonry 20 typically surrounds and defines the access opening 22 for support of the access opening cover 23, according to the knowledge of those skilled in the art. A second access opening 22 is spaced from the first access opening 22 by the trap lid 19 and is defined by additional brick masonry 20, capped by a second access opening cover 23. A vertically-oriented trap outlet pipe 28 extends downwardly toward the trap bottom 18 parallel to the trap inlet pipe 25 and is supported by a second trap side 17 and another pipe brace 26. The trap outlet pipe 28 is longer than the trap inlet pipe 25, as further illustrated in FIG. 1. The top of the trap outlet pipe 28 is open to the access opening 22 and a trap drain line 29 is connected to the top end of the trap outlet pipe 28 and extends through an outlet line opening 16 in the second one of the trap sides 17, for draining effluent from the trap container 14 to a sewer line (not illustrated).

A pair of cleanout collars 31 are normally provided in at least one of the floor drain lines 8 on both the inlet and outlet sides of the grease trap 13, as further illustrated in FIG. 1. These cleanout collars 31 access both the floor collection drain line 9 and the trap drain line 29 for cleaning purposes.

It will be appreciated from a consideration of FIGS. 1 and 2 of the drawing and FIG. 1 in particular, that grease and other waste material resulting from the cleaning and processing of food in the sink 1 readily flows downwardly through the sink drain lines 4 and sink collection drain line 5, into the floor drain lines 8, the floor collection drain line 9 and finally into the trap container 14 of the grease trap 13, through the vertical trap inlet pipe 25. The grease and other waste material accumulates in the water effluent in the trap container 14 and the grease slowly floats to the water level 27, as illustrated in FIG. 1. Effluent slowly disperses from grease trap 13 through the bottom of the trap outlet pipe 28 and the trap drain line 29, to the sewer (not illustrated). The grease and other waste material slowly disperses on the surface of the water 27, then sinks, and is continuously ejected to the sewer (not illustrated), along with the effluent, through the trap outlet pipe 28 and connecting trap drain line 29. However, under circumstances where the inflow of grease is more rapid than the capacity of the grease trap 13 to dissolve and disperse the accumulated grease in the trap container 14, undispersed grease is forced into the trap outlet pipe 28 and trap drain line 29, directly into the sewer, where it causes problems, both in the sewer and in the water treatment system downstream of the grease trap 13. According to the method of this invention the floor drains 7 and floor drain lines 8, as well as the floor collection drain line 9, trap inlet pipe 25, trap outlet pipe 28 and trap drain line 29 are initially inspected and cleaned to remove solids, including bits of debris, food particles and like material which prevent the flow of grease-laden wash water, or effluent. Drain line covers (not illustrated) which are cracked, broken or missing are repaired or replaced and reseated in the floor drains 7 to prevent the undesirable accumulation of additional solid debris, food particles and the like in the floor drain lines 8. These drain line covers are secured and all chemicals which might "kill" or prevent the growth and digestion of bacterial microorganisms for biodigesting grease are then prevented from flowing through the respective floor drain lines 8 and into the trap container 14 of the grease trap 13. These chemicals may include caustic commercial drain or floor cleaning preparations which are well known to those skilled in the art, as well as any other materials which might be harmful, not only to the bacterial microorganisms and ecosystem in the grease trap 13, but also to the outside environment, as well as humans, animals and plants. Suitable replacement materials for all such undesirable chemicals or materials are identified for use in place of these chemicals. The pH of the effluent in the grease trap 13 is then adjusted to about 7 by adding a chemically basic ingredient such as baking soda or bicarbonate of soda, in non-exclusive particular, initially into the floor drain line 8 which is closest to the grease trap 13, and later into the other floor drain lines 8, to treat the effluent in the trap container 14 of the grease trap 13. The grease trap 13 is then stirred using a power washer or other mechanical device to mix the effluent in the trap container 14 and achieve a uniform ph of about 7 throughout the effluent, which stimulates the endemic native bacteria resident in the grease trap. A suitable strain or strains of bacterial microorganisms well known to those skilled in the art for enhancing the natural bacteria present in the grease trap, is then added to the closest floor drain line 8 to the grease trap 13 and later to all the floor drain lines 8, for interaction with, and biodigestion of the grease in the trap container 14. Accordingly, the eco environment in the trap container 14 of the grease trap 13 is thusly normalized by bioremediation, for optimum reproduction and interaction of the bacterial microorganisms with the grease and biodigestion of the grease. This normalized or natural environment or ecosystem for biodigestion of the grease by the bacterial microorganisms must be maintained by continually preventing the flow of undesirable chemicals or other materials, solid or liquid, into the grease trap 13, which would interfere with the grease biodigestion process. Under these circumstances, the grease trap 13 will operate as designed, to discharge substantially grease-free effluent to the sewer system, thereby eliminating odor and presenting minimum problems for the water treatment system designed to handle such effluent for the community.

It will be recognized by those skilled in the art that substantially any known strain or strains of bacterial microorganisms which are developed for the digestion of grease in grease traps may be used according to the method of this invention. As noted above, a key factor in using any such bacterial microorganisms is to create an environment and ecosystem in any grease trap, whether domestic, commercial, industrial or municipal and however designed, which ecosystem is conducive to the free flow of drain wash water and effluent through the grease trap system, as well as the optimum growth of the bacteria and biodigestion of the grease prior to discharging of the grease trap effluent to the sewer system.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A method for biodigesting grease in a grease trap and in grease trap drain line systems and in wash water drain lines communicating with a corresponding floor drain and a trap discharge drain line terminating at the grease trap, said method comprising the steps of removing solid material from the floor drain, wash water drain lines, grease trap and trap discharge drain line; preventing the introduction of bacteria-inhibiting chemicals into the wash water drain lines and grease trap; adjusting the pH of the effluent in the grease trap to about 7; introducing selected grease-digesting bacterial microorganisms into the wash water drain lines; and agitating the effluent in the grease trap to disperse the bacteria organisms and obtain a substantially uniform pH in the effluent in the grease trap for biodigesting grease in the wash water drain lines, grease trap and trap discharge drain line.

2. The method according to claim 1 further comprising the step of repairing the floor drain to prevent accumulation of solid material in the wash water drain line and grease trap prior to adjusting the pH of the effluent.

3. A method for removing grease from grease traps, wash water drain lines communicating with corresponding floor drains and trap discharge drain lines serving the grease traps, said method comprising the steps of cleaning the floor drains, wash water drain lines, grease trap and trap discharge drain lines of solid material; preventing the introduction of bacteria-inhibiting chemicals into the wash water drain lines and grease traps; introducing at least one chemically basic material into the wash water drain lines to adjust the pH of the effluent in the grease traps to about 7; introducing grease-digesting bacterial microorganisms into the wash water drain lines; and agitating the contents of the grease traps to disperse the bacterial organisms and obtain a substantially uniform pH in the effluent in the grease trap for digesting grease accumulated in the wash water drain lines, grease traps and trap discharge drain lines.

4. The method according to claim 3 further comprising the step of repairing the floor drains to prevent accumulation of solid material in the wash water drain lines, grease traps and trap discharge drain lines prior to adjusting the pH of the effluent.

* * * * *